Figure 1:
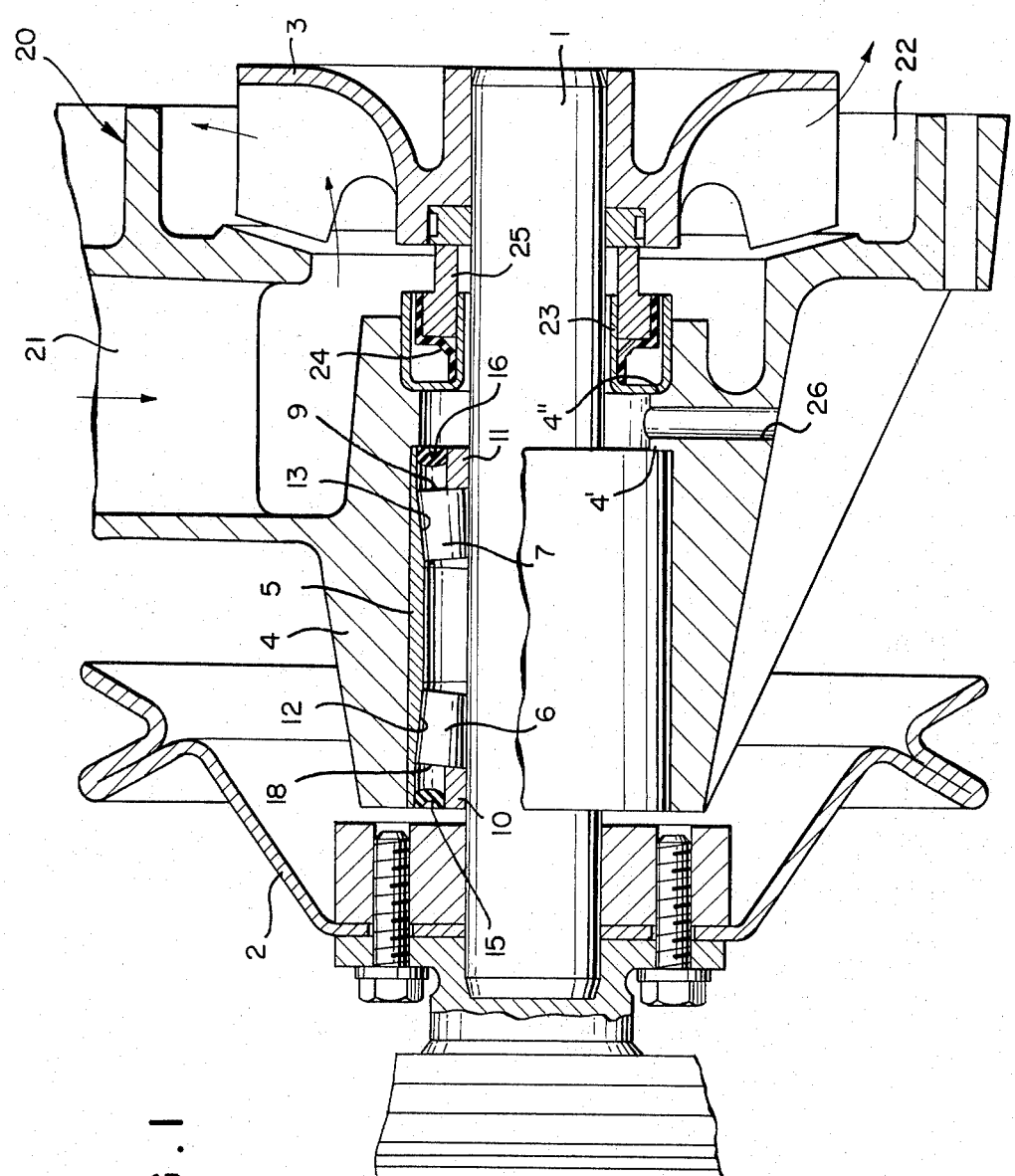

United States Patent [19]
Korrenn et al.

[11] 3,796,510
[45] Mar. 12, 1974

[54] SHAFT MOUNTING FOR WATER PUMPS AND THE LIKE

[75] Inventors: Heinz Korrenn; Gunter Markfelder, both of Schweinfurt, Germany

[73] Assignee: Kugelfischer Georg Schafer & Co., Schweinfurt, Germany

[22] Filed: June 28, 1972

[21] Appl. No.: 266,974

[30] Foreign Application Priority Data
July 31, 1971 Germany.................. P 21 38 434.9

[52] U.S. Cl.......... 415/170 A, 415/213, 415/219 C, 307/207, 307/214
[51] Int. Cl....... F04d 29/08, F04d 7/02, F16c 32/00
[58] Field of Search.... 415/170 A, 205, 204, 219 C; 308/207, 214, 213

[56] References Cited
UNITED STATES PATENTS

| | | | |
|---|---|---|---|
| 1,817,169 | 8/1931 | Schwitzer et al. | 415/205 |
| 2,365,065 | 12/1944 | Frankenfield | 415/170 A |
| 2,542,902 | 2/1951 | Chubbuck | 415/170 A |
| 2,656,734 | 10/1953 | Creson et al. | 308/207 R |
| 2,664,325 | 12/1953 | Bergstrom | 308/214 |
| 3,632,220 | 1/1972 | Lansinger | 415/170 |
| 1,304,430 | 5/1919 | Wickersham | 308/207 R |

*Primary Examiner*—Henry F. Raduazo
*Attorney, Agent, or Firm*—Karl F. Ross; Herbert Dubno

[57] ABSTRACT

The shaft of a pump, carrying an impeller, is supported in a bearing cylinder of a housing by a generally cylindrical bushing, press-fitted into that cylinder, whose inner peripheral surface diverges frustoconically outwardly at both ends. Two sets of frustoconical bearing rollers, with their wider bases facing outwardly, are wedged in between the shaft surface and the tapering bushing extremities and are held in place by two annular abutments, at least one of which is a ring fitted onto the shaft while the other one may be a shoulder integral therewith; flexible sealing rings at the ends of the bushing sweep the surfaces of these abutments.

8 Claims, 2 Drawing Figures

SHAFT MOUNTING FOR WATER PUMPS AND THE LIKE

Our present invention relates to a shaft mounting for rotary bodies exerting a certain axial thrust, e.g. for the impellers of pumps converting a radial into an axial fluid flow or vice versa. Such pumps are used, for example, for the forced cooling of internal-combustion engines by air or water.

The general object of our invention is to provide an improved mounting for the shaft carrying the impeller of such a pump, or any equivalent load, designed to resist axial displacement without the need for a separate thrust bearing.

A more particular object is to provide a mounting of this character which is of simple construction yet which can be readily modified to accommodate shafts of different diameters.

An assembly embodying our invention comprises a housing which forms a bearing cylinder for a shaft received therein with clearance, the shaft being spacedly surrounded by a bushing with symmetrically tapered extremities fitted into the cylinder. Two sets of frustoconical bearing rollers are wedged into the space between the shaft and the tapered extremities of the bushings, being held in place therein by abutment means whch may be in the form of a pair of raised formations on the shaft defining annular shoulders in contact with the outer ends of the rollers.

To simplify the assembly, and to allow the use of a unitary bushing, the inner surfaces of its extremities should diverge frustoconically outwardly, with the wider ends of the two sets of bearing rollers facing away from each other. At least one of the abutting formations may be a rigid ring separate form the shaft but fixedly secured thereto in a position in which the rollers are held in full contact with the shaft surface and with the tapering bushing extremities. When thus supported, the shaft may project from its bearing cylinder at both ends and may carry a driving pulley at one end and a load, such as an impeller wheel, at its other end.

Figure 2:
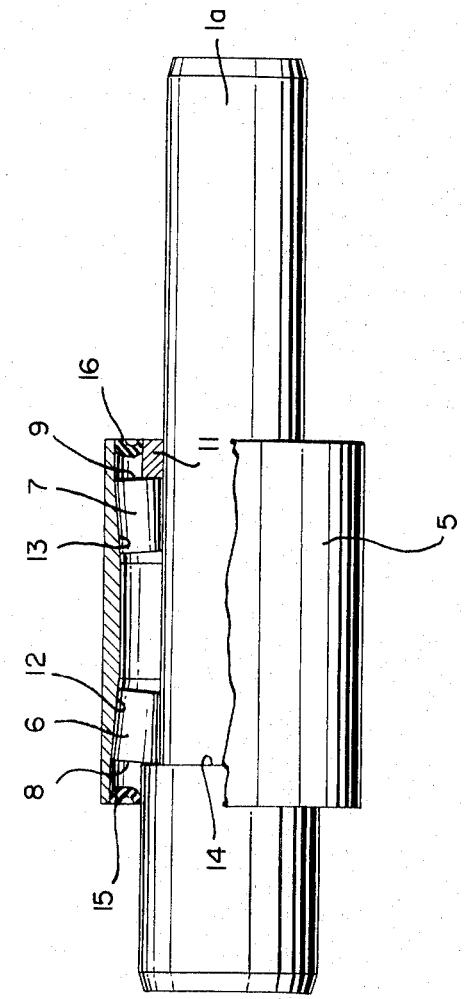

The above and other features of our invention will be described in greater detail hereinafter with reference to the accompanying drawing in which:

FIG. 1 is a somewhat diagrammatic view, in axial section, of a water pump embodying our improved shaft mounting; and FIG. 2 is a fragmentary view similar to FIG. 1 illustrating a modification.

The assembly shown in FIG. 1 includes a shaft 1 journaled in a bearing cylinder 4 which is rigid with a pump housing 20 forming an intake port 21 and a discharge port 22 for a fluid e.g. water) to be circulated with the aid of an impeller 3 on the free right-hand end of the shaft. The opposite shaft end carries a V-pulley 2 by which it may be rotated, together with impeller wheel 3, with the aid of a motor-driven belt not illustrated. Housing 20 may be integral with the frame of a vehicular internal-combustion engine, not shown, which is to be cooled by the circulated fluid.

The inner diameter of cylinder 4 substantially exceeds the diameter of shaft 1, this cylinder being internally lined by a relatively thin bushing 5 of generally cylindrical shape which rests against a shoulder 4' thereof and whose inner peripheral surface diverges outwardly at the extremities 12, 13 of its bore. Two sets of frustoconical bearing rollers 6 and 7, with outwardly facing wider ends, are wedged into the space between the shaft 1 and the tapering zones 12, 13, respectively, these wider ends 8, 9 contacting a pair of abutment rings 10, 11, respectively, which are fastened to the shaft surface by press-fitting, thermal shrinkage or other means. Flexible sealing rings 15, 16 of rubber or the like sweep the outer peripheries of rings 10 and 11 to confine a lubricant present within bushing 5.

As shown in FIG. 2, one of the rings (here the ring 10) may be replaced by a shoulder 14 of a stepped shaft 1a replacing the continuous shaft 1 of FIG. 1 in an otherwise identical assembly.

Bushing 5 may be made without machining by hot pressing, for example, and can be press-fitted into the cylinder 4 with or without adhesive bonding. If shaft 1 or 1a is to be replaced by one of slightly different diameter, e.g. for use in another type of vehicle, the difference can be compensated by a small axial shift of the bearing rollers 6,7. Greater differences in diameter can also be accommodated by substituting bearing rollers of different sizes but of the same vertex angle.

Another bushing 23, resting against a shoulder 4'' of cylinder 4, carries an elastic sealing ring 24 which bears upon a hub 25 of impeller wheel 3 to help contain the working fluid of the pump. The space between shoulders 4' and 4'' is vented to the atmosphere at 26.

The single mounting formed by bushing 5 and rollers 6, 7 serves both as a journal bearing and as a thrust bearing for the rotary shaft 1 or 1a which therefore requires no further support. Such a shaft mounting can also be used for other axially stressed loads, e.g. for a vertical drum of a washing machine.

In contradistinction to such antifriction bearing elements such as cylindrical rollers or balls, which require the machining of special races into the shaft surface, the frustoconical bearing rollers of our assembly can be used with any existing smooth-surfaced shaft.

We claim:

1. An assembly comprising a housing forming a bearing cylinder, a rotary shaft received with clearance in said cylinder, a bushing with symmetrically internally tapered extremities diverging frustoconically toward the shaft ends, said bushing being fitted into said cylinder in spaced relationship with said shaft, two sets of frustoconical bearing rollers with axially outwardly facing wider ends wedged into the space between said shaft and said extremities, and a pair of raised formations on said shaft defining annular shoulders engaging the wider ends of said bearing rollers for holding same in contact with the surfaces of said shaft and said bushing, said shaft at least in the regions of said rollers having cylindrical peripheries in direct contact with said bearing rollers, the axial position of said bushing relative to said shaft being maintained solely by the engagement of the frustoconical roller surfaces with said internally tapered extremities.

2. An assembly as defined in claim 1 wherein at least one of said raised formations is a rigid ring fixedly secured to said shaft.

3. An assembly as defined in claim 1, further comprising sealing means on said bushing surrounding said shoulders.

4. An assembly as defined in claim 3 wherein said sealing means are a pair of flexible rings on said bushing sweeping said raised formations.

5. An assembly as defined in claim 1 wherein said shaft has a pair of free ends projecting from said cylinder.

6. An assembly as defined in claim 5 wherein said shaft is provided with drive means on one of its free ends and with a load on its other free end exerting an axial thrust upon the shaft.

7. An assembly as defined in claim 6 wherein said load comprises an impeller of a fluid-circulating pump.

8. An assembly as defined in claim 7 wherein said housing forms intake and discharge ports for the fluid circulated by said impeller.

* * * * *